United States Patent Office 3,132,183
Patented May 5, 1964

3,132,183
PROCESS FOR THE PURIFICATION OF NITROCYCLOHEXANE
Ollie W. Chandler, Terre Haute, Ind., assignor to Commercial Solvents Corporation, New York County, N.Y., a corporation of Maryland
No Drawing. Filed Nov. 29, 1961, Ser. No. 155,807
5 Claims. (Cl. 260—644)

My invention relates to the purification of nitrocyclohexane and more particularly it relates to an improved process for purifying nitrocyclohexane by treatment with sulfuric acid and subsequent steam distillation.

Nitrocyclohexane, a compound used in the formation of caprolactam, is produced with accompanying adipic acid by the nitration of cyclohexane with nitric acid according to the process described in U.S. Patent 2,343,534, granted March 7, 1954, to R. M. Cavanaugh et al. Caprolactam is then produced from nitrocyclohexane by a reduction of the nitrocyclohexane to the intermediate, cyclohexanone oxime, in the presence of a reduction catalyst and subsequent conversion of the oxime to the lactam.

In order to obtain proper reduction of nitrocyclohexane, it is first necessary to remove impurities from the nitrocyclohexane. The reaction of cyclohexane and nitric acid, when conducted according to the process of the above-named patent, produces a two-phase reaction mixture, an aqueous phase which contains adipic acid, and an oil phase which contains the desired nitrocyclohexane, unreacted cyclohexane, and numerous oxidation products. The aqueous phase containing adipic acid is easily separated from the nitrocyclohexane by decantation. The remaining impure nitrocyclohexane can then be further purified by standard distillation procedures to remove the unreacted cyclohexane and the above-mentioned oxidation products such as cyclohexanone and cyclohexylnitrate. However, standard distillation procedures fail to allow satisfactory recovery of nitrocyclohexane because of the apparent loss of substantial amounts of nitrocyclohexane during the recovery procedure.

Many alterations to the general distillation procedures have been attempted with varying degrees of success in order to improve the amounts and the final purity of the recovered nitrocyclohexane product. One such process is described by Robert A. Smiley, in Journal of Organic Chemistry, volume 23, pages 1115–1117 (1958). This procedure generally consists of adding sulfuric acid to the oil layer portion of the nitration reaction mixture of cyclohexane, containing large amounts of nitrocyclohexane, in order to form a mixture, diluting the mixture with water or ice, adding cyclohexane in large volumes to the mixture to allow separation into a cyclohexane layer and a nitrocyclohexane-containing layer, decanting the cyclohexane layer from the nitrocyclohexane-containing layer, and vacuum distilling the nitrocyclohexane layer to obtain nitrocyclohexane of improved purity. Such a procedure is capable of permitting recovery of a nitrocyclohexane product having a purity in excess of 99%. However, during the procedure, generally more than 10% of the starting nitrocyclohexane is lost thus lowering the total amount of nitrocyclohexane which can be converted to caprolactam. In addition, this process is cumbersome and uneconomical because of the necessity to add cyclohexane and then separate the cyclohexane layer from the nitrocyclohexane-containing layer. This difficult and time-wasting procedure has been necessary for it has been found that the process is virtually inoperative when vacuum distillation is applied to the sulfuric acid-treated nitration reaction mixture before treatment with cyclohexane.

I have now discovered an improved procedure for the recovery of nitrocyclohexane from the nitration mixture of cyclohexane utilizing the previously-described sulfuric acid treatment. My improved procedure permits recovery of a nitrocyclohexane product having a purity of in excess of 99% but with an accompanying loss of nitrocyclohexane of less than 5%. In addition to the above advantages, my process does not require the addition of cyclohexane or the cumbersome decantation procedures required by the prior art, for my process permits recovery of sulfuric acid-treated nitrocyclohexane by a one-step distillation procedure. Thus it will be seen that my improved process not only incorporates all of the advantages made possible by the prior art sulfuric acid procedure but further introduces new advantages thus providing even more economies in the production of caprolactam.

Generally my improved process consists of adding sulfuric acid to an unpurified nitrocyclohexane-containing mixture to form a mixture and then steam-distilling the resulting mixture to obtain nitrocyclohexane of high purity.

Amounts of sulfuric acid which can be utilized in my process will naturally vary depending in the main on the amount and nature of the impurities found in the nitrocyclohexane-containing mixture to be purified. Generally, for most purposes, I have found that from about 2 parts to about 0.1 part by weight of sulfuric acid for every part by weight of nitrocyclohexane can be satisfactorily employed in my process.

Although it is not critical to my process, it is generally desirable, in order to obtain maximum results, that the sulfuric acid-unpurified nitrocyclohexane mixture be first diluted with water before the steam distillation step of my invention.

It is also preferable, for optimum results, to thoroughly mix the sulfuric acid and the unpurified nitrocyclohexane before steam distillation.

In carrying out the steam distillation step of my invention, any standard steam distillation procedure known to the art can be satisfactorily employed.

The following examples serve to illustrate my invention; but it is not intended that my invention be limited to the procedures, conditions, or specific materials set forth therein.

*Example I*

To a 600-gram portion of an oil layer obtained by the nitration of cyclohexane having the following composition:

| | Percent |
|---|---|
| Cyclohexanone | 3.0 |
| Cyclohexylnitrate | 1.3 |
| Nitrocyclohexene | 0.9 |
| Nitrocyclohexane | 94.7 | were added 100 grams of 96% sulfuric acid at such a rate to give a final temperature of 70° C. The resulting mixture was held at 70° C. with accompanying thorough agitation for a three-hour period. At the end of the three-hour period the resulting mixture was cooled to 20° C. by the addition of 100 milliliters of water. The resulting mixture was then steam distilled at atmospheric pressure to obtain a product weighing 540 grams, the said product containing 99.5% nitrocyclohexane thus showing a recovery of the initially treated nitrocyclohexane of 95%.

Now having described my invention, what I claim is:
1. A process for the purification of nitrocyclohexane which comprises adding sulfuric acid to a nitrocyclohexane-containing mixture and subsequently subjecting the resulting mixture to steam distillation.
2. A process for the purification of nitrocyclohexane which comprises adding to a nitrocyclohexane-containing mixture from about 2 to about 0.1 parts by weight of sulfuric acid for each part by weight of nitrocyclohexane to form a mixture and subsequently subjecting the mixture to steam distillation to obtain substantially pure nitrocyclohexane.

3. A process for the purification of nitrocyclohexane which comprises adding sulfuric acid to a nitrocyclohexane-containing mixture in amounts of from about 2 to about 0.1 parts by weight of sulfuric acid for each part by weight of nitrocyclohexane to form a mixture, diluting the mixture with water, and subsequently subjecting the diluted mixture to steam distillation to obtain substantially pure nitrocyclohexane.

4. A process for the purification of adipic acid free and unreacted cyclohexane free nitrocyclohexane produced by the nitration of cyclohexane which comprises adding sulfuric acid to an adipic acid free nitrocyclohexane-containing mixture in amounts of from about 2 to about 0.1 parts by weight of sulfuric acid for each part by weight of nitrocyclohexane to form a mixture, diluting the mixture with water, and subsequently subjecting the mixture to steam distillation to obtain substantially pure nitrocyclohexane.

5. A process for the purification of nitrocyclohexane-containing mixture produced by the nitration of cyclohexane which mixture is free of adipic acid and unreacted cyclohexane, which comprises adding sulfuric acid to said nitrocyclohexane-containing mixture in amounts of about 2 to about 0.1 parts by weight of sulfuric acid to form a mixture and subjecting the mixture to steam distillation to obtain substantially pure nitrocyclohexane.

References Cited in the file of this patent

UNITED STATES PATENTS 3,035,100    Kirby et al. _____ May 15, 1962

OTHER REFERENCES

Weissberger Technique of Organic Chemistry, vol. IV, Distillation, pages 374 and 375. Published by Interscience Publishers, Inc., New York (1951).

Smiley: J. Org. Chem., vol. 33, pp. 1115–1117 (1958).